United States Patent [19]
Bloom

[11] Patent Number: 5,764,348
[45] Date of Patent: Jun. 9, 1998

[54] OPTICAL SWITCHING ASSEMBLY FOR TESTING FIBER OPTIC DEVICES

[76] Inventor: Cary Bloom, 251 Blaze Climber Way, Rockville, Md. 20850

[21] Appl. No.: 725,651

[22] Filed: Oct. 1, 1996

[51] Int. Cl.$^6$ .......................... G01N 21/59; G01N 21/84
[52] U.S. Cl. ........................................................ 356/73.1
[58] Field of Search ........................................... 356/73.1

[56] References Cited

U.S. PATENT DOCUMENTS

| | | |
|---|---|---|
| Re. 33,296 | 8/1990 | Stowe et al. . |
| Re. 34,955 | 5/1995 | Anton et al. . |
| 3,854,003 | 12/1974 | Duret . |
| 4,026,632 | 5/1977 | Hill et al. . |
| 4,597,338 | 7/1986 | Thorncraft et al. . |
| 4,611,894 | 9/1986 | Roberts . |
| 4,699,453 | 10/1987 | Roberts . |
| 4,701,010 | 10/1987 | Roberts . |
| 4,714,316 | 12/1987 | Moore et al. . |
| 4,763,977 | 8/1988 | Kawasaki et al. . |
| 4,772,085 | 9/1988 | Moore et al. . |
| 4,779,945 | 10/1988 | Hill et al. . |
| 4,792,203 | 12/1988 | Nelson et al. . |
| 4,798,438 | 1/1989 | Moore et al. . |
| 4,834,481 | 5/1989 | Lawson et al. . |
| 4,895,423 | 1/1990 | Bilodeau et al. . |
| 4,900,119 | 2/1990 | Hill et al. . |
| 4,906,068 | 3/1990 | Olson et al. . |
| 4,923,273 | 5/1990 | Taylor . |
| 4,995,688 | 2/1991 | Anton et al. . |

(List continued on next page.)

FOREIGN PATENT DOCUMENTS

| | | | |
|---|---|---|---|
| 0293289 | 5/1988 | European Pat. Off. . | |
| 2235043 | 2/1991 | United Kingdom | 356/73.1 |
| WO 87/00934 | 7/1986 | WIPO . | |
| 0215668A2 | 9/1986 | WIPO . | |

OTHER PUBLICATIONS

"Automated Fabrication of Fused Fibre Optic Couplers", by Robert Frank Swain, dissertation, Heriot–Watt University, Edinburgh, Ireland (1993).

"Tapered Optical Fiber Components and Sensors", by L.C. Bobb, et al., Microwave journal, May 1992. pp. 218,220, 223,224,226 & 228.

"The Shape of Fiber Tapers", by T.A. Birks at al., Journal of Lightwave Technology, IEEE, vol. 10, No. 4, Apr. 1992, pp. 432–438.

"Mass Production of Fused Couplers and Coupler Based Devices", by W.E. Moore et al. No date.

"Loss and Spectral Control in Fused Tapered Couplers", by K.P. Oakley et al., Optical Engineering, vol. 33, No. 12, Dec. 1994, pp. 4006–4019.

"Control of Optical Fibre Taper Shape", Electronics Letters, vol. 27, No. 18, Aug. 29, 1991. pp. 1654–1656.

"Fiber–Coupler Fabrication with Automatic Fusion–Elongation Processes for Low Excess Loss and High Coupling–Ratio Accuracy", by I. Yokohama, et al., Journal of Lightwave Technology, IEEE, vol. LT-5, No. 7, Jul. 1987.

IC Assembly Technology, pp. 3–26 –3–32. No date.

"Fibre–optic Coupler Fabrication at AOFR", by A.J. Stevenson et al., International Journal of Optoelectronics, vol. 6, Nos. ½, pp. 127–144.

"Generic Reliability Assurance Requirements for Fiber Optic Branching Components", Bellcore, GR–1221–CORE, Issue 1, Dec. 1994.

"Generic Requirements for Fiber Optic Branching Components", Bellcore, GR–1209–CORE, Issue 1, Nov. 1994.

*Primary Examiner*—Vincent P. McGraw
*Attorney, Agent, or Firm*—Lowe, Price, LeBlanc & Becker

[57] ABSTRACT

Fiber optic devices are tested using an optical switching assembly having two optical switches and optical junctions, each optical junction connects an optical fiber from each of the switches to an external optical fiber lead. Each switch is connected to an optical device, for example a laser or a detector, and selectively establishes an optical path between the corresponding optical device and one of the junctions. Hence, a fiber optic device may be tested by connecting the ends of the fiber optic device to respective junction leads, and selectively switching the optical paths to determine the different optical characteristics of the fiber optic device. Calibration devices may also be connected to the leads of unused junctions to check for calibration accuracy and to detect variation in optical performance over time.

10 Claims, 4 Drawing Sheets

U.S. PATENT DOCUMENTS

| | | |
|---|---|---|
| 4,997,243 | 3/1991 | Aiki et al. . |
| 4,997,245 | 3/1991 | DuPuy et al. . |
| 4,997,247 | 3/1991 | Stowe . |
| 4,997,248 | 3/1991 | Stowe . |
| 4,997,252 | 3/1991 | Sugawara et al. . |
| 4,997,253 | 3/1991 | Enochs . |
| 5,013,117 | 5/1991 | Fukuma . |
| 5,013,121 | 5/1991 | Anton et al. . |
| 5,028,110 | 7/1991 | Plummer . |
| 5,031,994 | 7/1991 | Emmons . |
| 5,037,176 | 8/1991 | Roberts et al. . |
| 5,066,149 | 11/1991 | Wheeler et al. . |
| 5,067,678 | 11/1991 | Henneberger et al. . |
| 5,093,885 | 3/1992 | Anton . |
| 5,121,453 | 6/1992 | Orazi et al. . |
| 5,123,219 | 6/1992 | Beard et al. . |
| 5,136,121 | 8/1992 | Kluska et al. . |
| 5,157,751 | 10/1992 | Maas et al. . |
| 5,159,655 | 10/1992 | Ziebol . |
| 5,166,992 | 11/1992 | Cassidy et al. . |
| 5,166,994 | 11/1992 | Stowe et al. . |
| 5,179,608 | 1/1993 | Ziebol et al. . |
| 5,179,618 | 1/1993 | Anton . |
| 5,189,723 | 2/1993 | Johnson et al. . |
| 5,208,894 | 5/1993 | Johnson et al. . |
| 5,214,732 | 5/1993 | Beard et al. . |
| 5,214,735 | 5/1993 | Henneberger et al. . |
| 5,222,176 | 6/1993 | Webber et al. . |
| 5,239,604 | 8/1993 | Ziebol et al. . |
| 5,251,002 | 10/1993 | Gryk ............................ 356/73.1 |
| 5,261,019 | 11/1993 | Beard et al. . |
| 5,274,731 | 12/1993 | White . |
| 5,283,852 | 2/1994 | Gibler et al. . |
| 5,293,440 | 3/1994 | Miles et al. . |
| 5,293,582 | 3/1994 | Beard et al. . |
| 5,305,405 | 4/1994 | Emmons et al. . |
| 5,316,243 | 5/1994 | Henneberger . |
| 5,317,663 | 5/1994 | Beard et al. . |
| 5,319,728 | 6/1994 | Lu et al. . |
| 5,319,733 | 6/1994 | Emmons et al. . |
| 5,329,600 | 7/1994 | Sasaoka et al. ............ 356/73.1 |
| 5,343,544 | 8/1994 | Boyd et al. . |
| 5,355,426 | 10/1994 | Daniel et al. . |
| 5,363,465 | 11/1994 | Korkowski et al. . |
| 5,367,591 | 11/1994 | Seike et al. . |
| 5,381,497 | 1/1995 | Toland et al. . |
| 5,386,484 | 1/1995 | Ooka et al. . |
| 5,386,488 | 1/1995 | Oikawa . |
| 5,386,490 | 1/1995 | Pan et al. . |
| 5,395,101 | 3/1995 | Takimoto et al. . |
| 5,422,969 | 6/1995 | Eno . |
| 5,432,875 | 7/1995 | Korkowski et al. . |
| 5,445,319 | 8/1995 | Pan et al. . |
| 5,459,598 | 10/1995 | Carrington . |
| 5,463,704 | 10/1995 | Ziebol . |
| 5,475,780 | 12/1995 | Mizrahi . |
| 5,475,782 | 12/1995 | Ziebol . |
| 5,475,784 | 12/1995 | Bookbinder et al. . |
| 5,497,444 | 3/1996 | Wheeler . |
| 5,577,149 | 11/1996 | Averbeck et al. . |
| 5,588,087 | 12/1996 | Emmons et al. . |
| 5,602,952 | 2/1997 | Rashleigh et al. . |

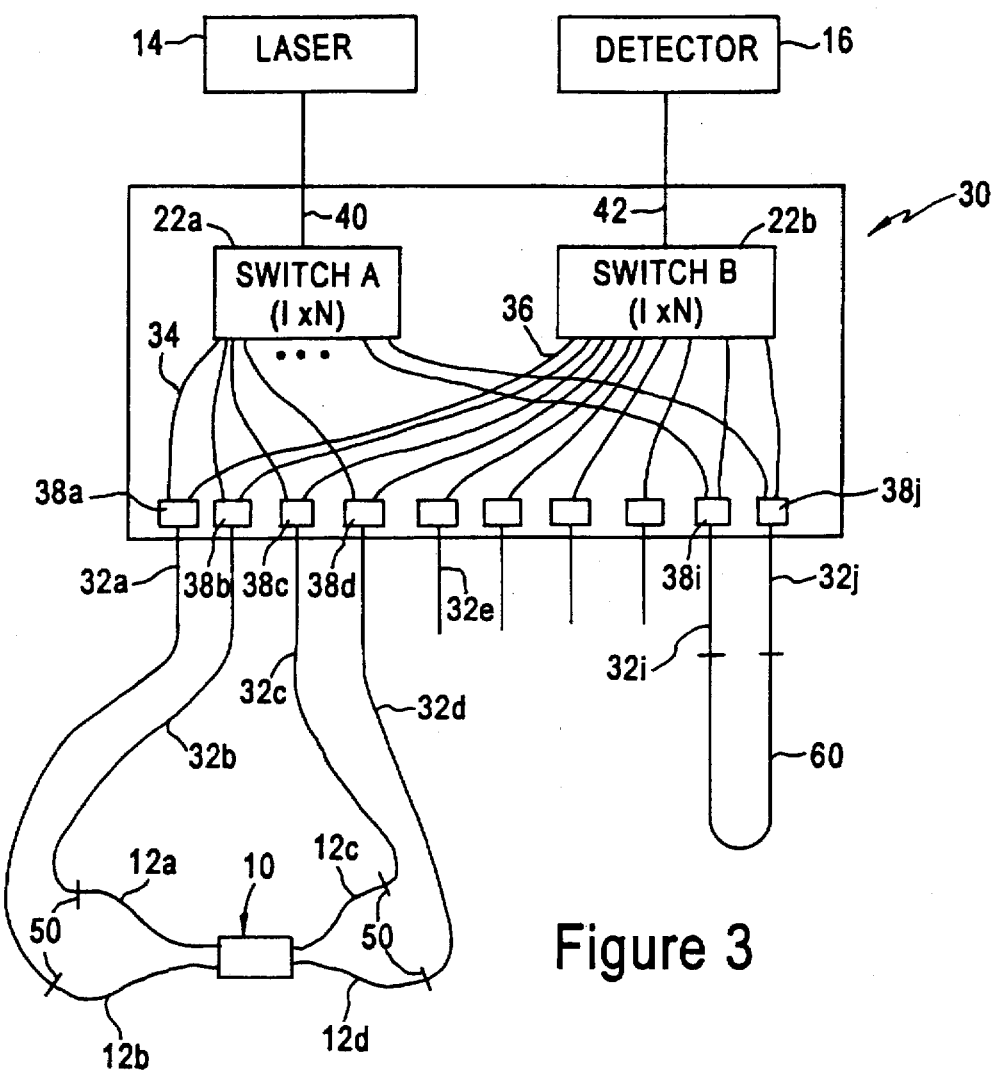
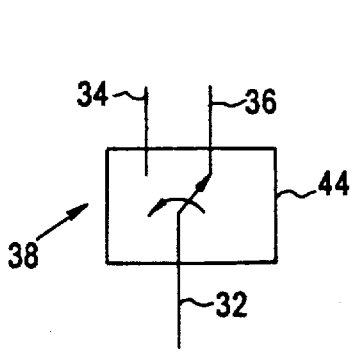
Figure 4A
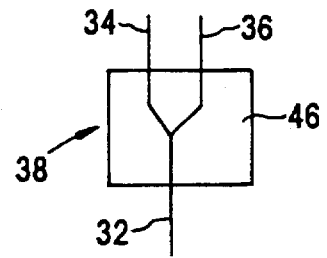
Figure 4B
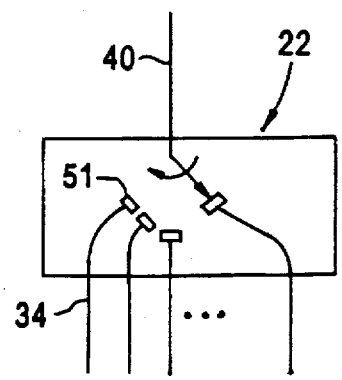
Figure 5
Figure 3

OPTICAL SWITCHING ASSEMBLY FOR TESTING FIBER OPTIC DEVICES

TECHNICAL FIELD

The present invention relates to optical switches, specifically optical switches used for testing fiber optic devices such as fiber optic couplers.

BACKGROUND ART

Fiber optic devices are tested after manufacture to determine their optical characteristics. For example, attenuators may be tested to determine the actual attenuation of the device, and fiber optic couplers may be tested to determine the coupling ratio at selected wavelengths and polarizations.

FIG. 1 is a conventional arrangement for testing a fiber optic coupler. The fiber optic coupler 10 includes fiber optic leads 12a, 12b, 12c, and 12d that are connected to a testing apparatus to determine the optical characteristics of the fiber optic coupler 10. The fiber optic coupler 10 is tested by providing light from a light source, for example a laser 14, into one of the fiber optic leads 12a at a predetermined input power, and measuring the output from the fiber optic leads 12a, 12b, 12c, and 12d using detectors 16a, 16b, 16c, and 16d, respectively. The detected power levels are used to develop a transfer matrix, which identifies the transfer of power from points A to B, A to C, A to D, and the back reflected power from A back to A. The back reflected power (A to A) is detected by a detector 16a via a coupler 18, also referred to as a test coupler or "zero" coupler. The detected power levels ($P_i$) are also used to determine the insertion loss for each optical path, namely the fraction of power entering an input port A that exits a corresponding output port (i.e., $L_{AC} = -10\log(P_A/P_C)$), and the excess loss ($L_E$) which specifies in decibels the amount of power lost between the inputs and outputs ($L_E = -10\log(P_C + P_D) - 10\log(P_A)$). A specification for the sensitivity of the fiber optic coupler 10 with respect to the tested wavelength and the tested polarization state can also be determined for the transfer matrix by varying the wavelength and polarization state of the input light.

The testing apparatus of FIG. 1 has a number of associated problems. A primary problem is that substantially all of the testing must be done manually, where a technician fusion splices the fiber optic coupler 10 onto the testing apparatus at splicing points 20a, 20b, 20c, and 20d. After testing the input A, the technician needs to cut and resplice the leads to test input B, and possibly inputs C and D. Hence, poorly-spliced connections may cause undesirable variables in the measured readings.

In addition, use of an additional coupler 18 to test for back reflectance introduces additional uncertainty as to the amount of power actually entering into the fiber optic coupler 10 at point A, since losses may occur in the test coupler 18. For example, some of the laser energy input to the coupler 18 may be lost as energy directed to the detector 16a instead of the input point A of the coupler 10. The coupler 18 may also have its own back reflection characteristics between the laser 14, the detector 16a and the fusion splice 20a. Depending on the characteristics of the test coupler 18, the laser light may encounter a −3 dB loss before reaching the input point A, and back reflected light from point A may encounter another −3 dB loss during travel via the coupler 18 to the detector 16a. Hence, the coupler 18 may add at least −6 dB of loss due to laser light passing from the laser 14 to the fusion splice 20a via the coupler 18, and loss of the back reflected light from optical fiber 12a passing through the coupler 18 to the detector 16a. The losses associated with the coupler 18 might be determined by splicing in a detector in place of the splice 20a or using a wide area detector to measure the output of the coupler 18 before performing the splicing of coupler 10. However, such a procedure is a labor intensive and may produce additional variances during calibration.

Moreover, the testing arrangement of FIG. 1 is a labor intensive process, requiring manual splicing to add lasers, detectors and couplers to the device under test. The repeated fusion splicing and disconnections of the optic testing apparatus of FIG. 1 with different configurations for the device 10 under test adds additional variances, reducing the accuracy of the overall measured power values of the transfer matrix. Hence, it becomes relatively difficult to test the device 10 when the test coupler 18 and the fusion splice 20a introduce losses on the same order of magnitude as the optical characteristic being measured.

Optical switches have been used to test long term optical characteristics during environmental testing, for example long term insertion loss of an optical device. FIG. 2 is a diagram illustrating uses of 1×4 switches in a conventional arrangement to test long term variations. The test equipment 14, 16, 22, and 26 of FIG. 2 is maintained in a controlled environment, where conditions such as temperature, humidity, etc. are maintained at a stable level to determine long term variations in the device under test 10. The device under test 10, however, may be subject to environmental changes to determine long term reliability.

Switch 22a has fiber optic leads 24a, 24b, 24c, and 24d, and switch 22b has leads 24e, 24f, 24g, and 24h. The fiber optic coupler 10 has optical fibers 12a, 12b, 12c, and 12d coupled to leads 24a, 24b, 24g, and 24h via fusion splices 20a, 20b, 20c, and 20d, respectively. The laser 14 is connected to the switch 22a via the coupler 18, and the second end of the coupler 18 is connected to the lead 24e of switch 22b via a fusion splice 20g. The lead 24c of switch 22a is connected to the lead 24f of switch 22b via fusion splices 20e and 20f. The switch 22a is also connected to a reference reflector 26, used for measuring reflected light for calibration purposes.

The arrangement of FIG. 2 tests for back reflectance using the coupler 18 by calibrating the setup using the reflector 26, where laser light passing from the laser 14 to the switch 22a via the coupler 18 is directed to the lead 24d. The reflector 26 reflects the light back to the switch 22a via the lead 24d, and the switch redirects the reflected light back to the coupler 18. The coupler 18, having once reduced the input laser light by −3 dB, adds an additional −3 dB loss as the reflected light is split by the coupler and supplied in part to the laser 14 and the lead 24e for detection by the detector 16 after having passed through the switch 22b. Leads 24c and 24f are used to calibrate the losses due to the coupler 18 and the switches 22a and 22b before passing to the detector 16.

The system of FIG. 2 does not permit the position of the source or detector to be changed. Since laser light is passed through only one of the leads 24a, 24b, 24c, or 24d at a time, the system of FIG. 2 does not provide any arrangement for testing the fiber optic coupler 10 by inputting light into the leads 12c and 12d of the coupler 10. Hence, the arrangement of FIG. 2 is not readily practical for use in a production environment, where a fiber optic coupler needs to be tested reliably and in a time-efficient manner, since the leads of the fiber optic device 10 still need to be disconnected and respliced to fully test the fiber optic device. Hence, variations are still present due to resplicing efforts.

DISCLOSURE OF THE INVENTION

There is a need for an arrangement that enables a fiber optic device to be tested accurately and efficiently with a minimum degree of fusion splicing.

There is also a need for an arrangement that enables a plurality of fiber optic devices to be connected in sequence for rapid testing in a production environment.

There is also a need for an arrangement for testing different characteristics of a fiber optic device without disconnecting and reconnecting an optical device, such as a light source or a detector.

These and other advantages are attained by the present invention, where an optical switching assembly combines the leads of at least two optical switches with a plurality of junctions, where each junction connects corresponding leads from the two optical switches to an output lead.

According to one aspect of the present invention, an optical switching assembly comprises first and second groups of optical fibers, each optical fiber having a first and second end, a first optical switch for selectively connecting a light source to the first end of one of the first group of optical fibers, a second optical switch for selectively connecting an optical device to the first end of one of the second group of optical fibers, and a plurality of junctions, each having an optical fiber lead and connecting the second end of a corresponding optical fiber from the first group and the second end of a corresponding optical fiber from the second group to the optical fiber lead. The optical fiber lead of the device under test is connected to a corresponding lead of one of the junctions, enabling each lead of the fiber optic device to be successively tested by switching the first and second optical switches to selectively connect the light source and the detector to different leads of the fiber optic device. Moreover, the optical switching assembly may include a large number of junctions, enabling a plurality of fiber optic devices to be successively connected to the optical switching assembly, enabling multiple tests without disconnecting the laser or the detector.

Another aspect of the present invention provides a method for testing a fiber optic device, comprising the steps of connecting at least first and second ends of the fiber optic device to respective first and second junctions of an optical switching assembly, the optical switching assembly comprising a first optical switch and a second optical switch, each of the junctions having first and second optical fibers connecting the corresponding junction to the first and second optical switches, respectively, setting the first optical switch to route light received from a first light source to the first junction, setting the second optical switch to route light received from the second junction to a detector, and determining a first characteristic of the fiber optic device based on the light from the first light source transmitted through the first junction and the light received from the second junction. Use of the optical switching assembly enables the first characteristic and subsequent characteristics to be determined without disconnecting and reconnecting the laser or the detector. Hence, the fiber optic device can be tested more reliably in an automated environment, for example an automated production facility.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout and wherein:

FIG. 3 is a diagram of an optical switching assembly according to an embodiment of the present invention.

FIGS. 4A and 4B are diagrams illustrating different implementations of the junctions of FIG. 3.

FIG. 5 is a diagram of one of the optical switches of FIG. 3.

BEST MODE FOR CARRYING OUT THE INVENTION

Figure 1:
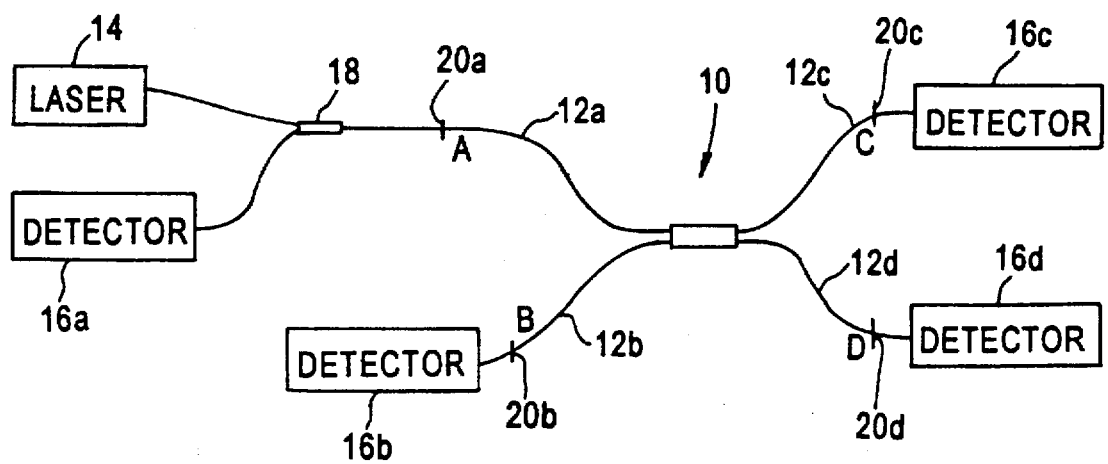
FIG. 1 is a diagram illustrating a conventional arrangement for testing a fiber optic coupler.
Figure 2:
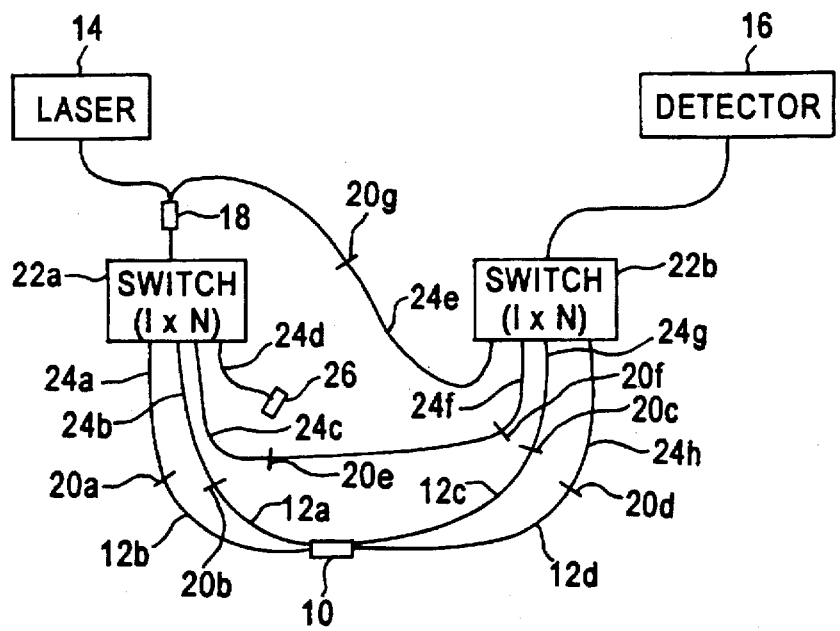
FIG. 2 is a diagram of a conventional arrangement for long term testing of a fiber optic coupler using optical switches.

FIG. 3 is a diagram of an optical switching assembly according to an embodiment of the present invention. The optical switching assembly 30 selectively connects a laser 14 and a detector 16 to leads 32 that are used to connect the switching assembly 30 to a fiber optic device 10. As shown in FIG. 3, the optical switching assembly 30 includes two 1×N switches 22a and 22b, a first group of optical fibers 34, a second group of optical fibers 36, and a plurality of junctions 38.

FIGS. 4A and 4B are diagrams illustrating alternative implementations of the junctions 38 of FIG. 3. The junction 38 of FIG. 4A is implemented as an optical 1×2 switch 44 that selects between one of the first group of optical fibers 34 and the second group of optical fibers 36 for connection with the corresponding lead 32. The junction 38 may also be implemented as a passive coupler 46, shown in FIG. 4B, that connects one of the optical fibers from each group 34 and 36 with the corresponding lead 32.

FIG. 5 is a block diagram illustrating in detail one of the switches 22 of FIG. 3. The switch 22 is preferably a 1×N switch, where an external control selectively connects a terminal end, for example lead 40, to one of the first group of optical fibers 34. An exemplary optical switch is the commercially available fiber optic switch by DiCon Fiber Optics, Inc., Berkeley, Calif., Model No. MC601. The switch 22 has a maximum insertion loss of −1.3 dB (−0.6 dB typical), and a maximum back reflection of −55 dB (−60 dB typical) at wavelengths of 1310 and 1550 nm (broadband). Short term repeatability should be ±0.005 dB. Each of the optical fibers 34 connected to the switch 22 are terminated within the switch 22 by a Graded Refracted Index (GRIN) rod lens 51 that provides minimal insertion loss and maximum coupling efficiency. Each optical fiber is also angled and coated with an anti-reflective coating to minimize back reflectance in the event that the particular optical fiber 34 is not connected to the optical fiber 40 by the switch 22. The GRIN lens 51 is preferably a quarter-wavelength (0.25) pitch.

As shown in FIG. 3, the fiber optic coupler 10 is connected to the optical fiber leads 32 of the optical switching assembly 30 by fusion splices 50. Each lead 12 of the fiber optic device is connected to a corresponding lead of one of the junctions 38 of the optical switching assembly 30. The laser 14 is connected to the switch A 22a via an optical fiber 40, and the detector 16 is connected to switch B 22b via an optical fiber 42. All fibers are preferably single mode fibers.

Once the fiber optic device 10 is connected to the switching assembly 30, the switches 22 are controlled so that the laser 14 supplies laser energy to only one of the first group of optical fibers 34, and the detector 16 receives transmitted light energy from only one of the second group of optical fibers 36. For example, assuming that switch A was set to route light received from the light source 14 to the junction 38a, and switch B was set to route light received from junction 38a to the detector 16, the test assembly would be able to automatically determine the back reflectance of light from lead 12b of the fiber optic device 10 via the lead 32a. After testing for back reflectance, the coupling ratio of leads 12c and 12d relative to light input to lead 12b can be determined by successively setting the switch B to transmit light to the detector 16 light received from lead 32c, measuring the detected light, and then switching the switch B 22b to route the light from lead 32d to the detector 16. In addition, near-end crosstalk of the coupler 10 can be determined by maintaining switch A 22a to input light to the lead 32a, and setting the switch B 22b to route light received from lead 32b to the detector 16.

Hence, the optical fiber device 10 can be tested in any desired manner without the necessity of disconnecting and reconnecting leads to the optical fiber device. The optical switch box assembly 30 is particularly beneficial for production environments, where automated production of optical fiber devices is preferred. Moreover, variations in the coupling losses in the optical fiber assembly 30 may be quickly identified before each test by switching the optical switches 22a and 22b to junctions 38i and 38j having leads 32i and 32j fusion spliced with a single optical fiber 60, also referred to as a loopback fiber, that enables the detector 16 to quickly measure the loss of the optical switching assembly 30, or optical characteristics of the laser 14, for example laser power, wavelength, polarization state, etc. Variations can be detected by comparing the detected value of the loss during connection to the loopback fiber 60 with previously-stored values. Variations can also be detected by switching the optical switches 22a and 22b to lead 32e, which is terminated with a commercially-available external reference reflector (−35 to −40 dB) (not shown). Alternately, the end of fiber 32e can be cleaved by scoring the fiber end using a diamond tip perpendicular to the length of the fiber.

Figure 6:
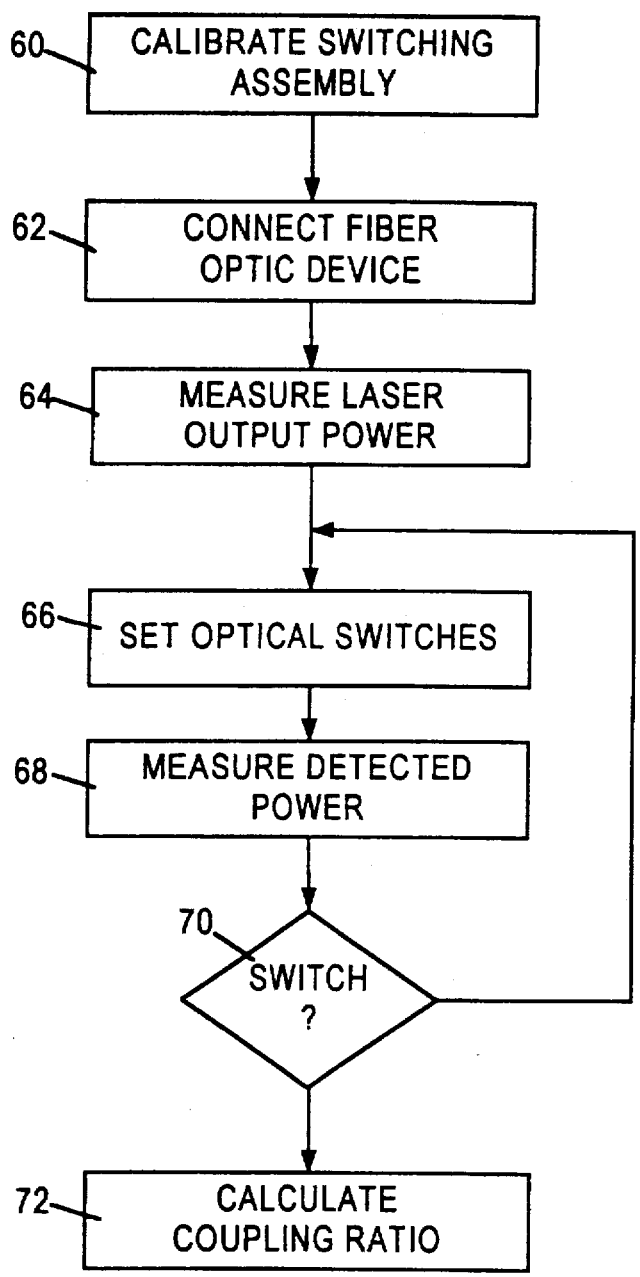
FIG. 6 is a flow diagram of a method for testing a fiber optic device according to an embodiment of the present invention.

FIG. 6 is a diagram illustrating the method of testing a fiber optic device according to an embodiment of the present invention. The method begins in step 60, where the switching assembly 30 is calibrated in order to determine the internal optical characteristics, including the insertion loss, back reflectance, and directivity of each of the switching paths established by the switches 22 and the junctions 38. Additional details regarding calibrating the optical switching assembly are described below with respect to FIG. 7.

After calibrating the optical switching assembly, the fiber optic device 10 is connected to the optical switching assembly 30 in step 62. For example, each of the leads 12a, 12b, 12c, and 12d are spliced using fusion splices 50 to leads 32b, 32a, 32c, and 32d, respectively. Alternately, the leads 32 may be connected to the respective leads 12 using optical connectors. The output power of the light source 14 is measured in step 64, for example by using a remote computer device (not shown) to read the power setting of the laser 14, or by using the loopback 60. The switches 22a and 22b are then set in step 66 to establish the first optical switching path. For example, switch A 22a is set to route light received from the laser 14 to junction 38a in order to pass light to lead 12b of the fiber optic coupler 10. The switch B 22b is also set to route light received from a desired junction, for example 38a, to the detector 16 in order to test back reflectance.

The detector 16 then measures the power of the light supplied by lead 42 from the optical path established by switches A and B in step 68. The measurement results may then be output to an external computer (not shown). Alternately, the results may be stored in the detector 16. After measuring the power from the established optical path, a determination is made in step 70 whether to switch the switches 22a and 22b to another optical path to determine another characteristic of the fiber optic device 10 under test. If another characteristic of the device under test is to be measured, at least one of the switches 22 is switched to another junction 38 to establish another optical path. For example, switch 22b will typically be switched after each measurement in order to determine the amount of light received by the different leads 12a, 12c, and 12d from the light inserted into lead 12b. Alternately, switches A and B may temporarily switch to the reflector on the end of lead 32e or the loopback fiber 60 in order to check any variations in the optical performance of the switch assembly 30, or to measure the optical characteristics of the laser 14.

If in step 70 it is determined that no additional switching is necessary, then the method calculates the desired characteristics of the device under test based on the light received by the detector 16 via switch B 22b and lead 42. Hence, the switch box assembly of FIG. 3 enables the coupler 10 under test to be thoroughly tested without disconnecting and resplicing the leads 12 to the test equipment.

Figure 7A:
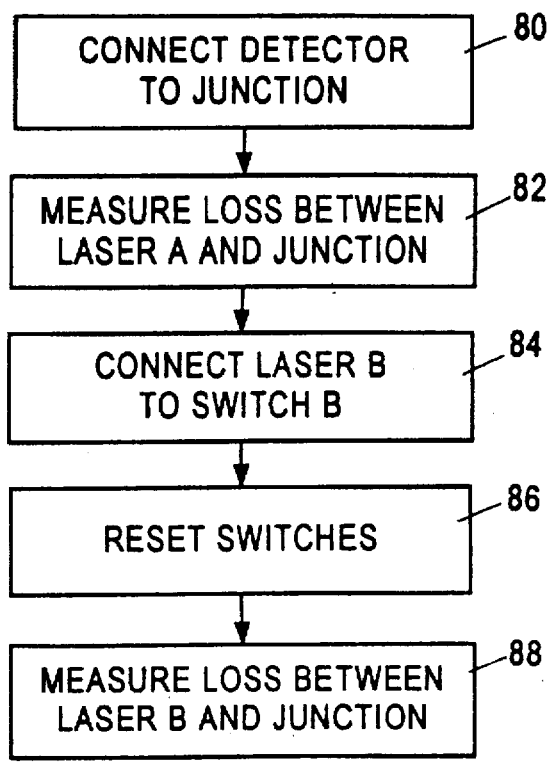
FIGS. 7A and 7B are diagrams illustrating a method for calibrating the optical switch assembly of FIG. 3.
Figure 7B:
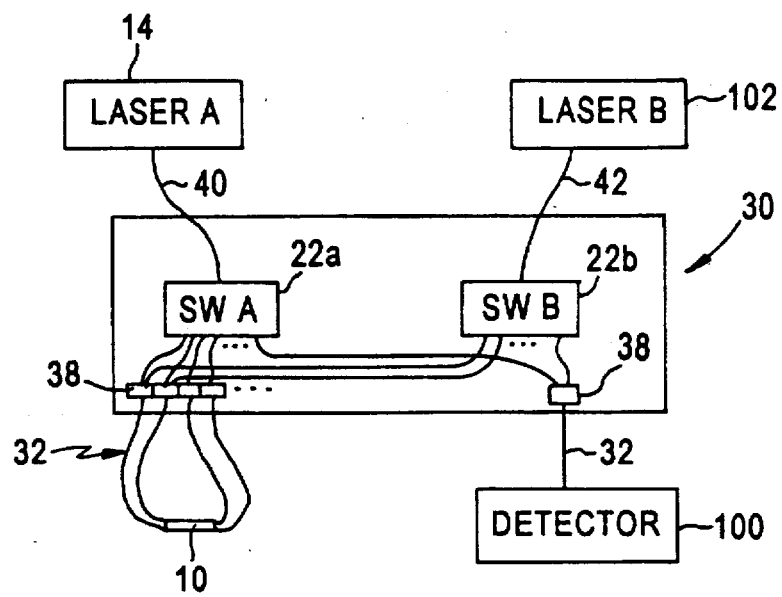

FIG. 7A is a flow diagram illustrating one technique for calibrating the switching assembly 30 in step 60 of FIG. 3. The method begins prior to connecting the fiber optic device 10 to the optical switching assembly 30 in step 62 by connecting the test assembly 30 as shown in FIG. 7B. Specifically, a reference detector 100 is connected in step 80 to one of the junctions 38, for example an unused lead 32 of the optical switching assembly. If desired, a plurality of devices under test and/or calibration equipment, for example a second laser or a second detector, can be connected to the switching assembly 30 via respective junctions 38 to enable calibration while the devices under test are connected to the switching assembly 30.

After connecting the detector 100 to the corresponding junction, the detector 100 in step 82 measures the loss between the laser 14 and the connected junction to determine the loss between the laser 14, the switch 22a, and the corresponding junction 38. A second laser 102 is then connected to switch B 22b via lead 42 in step 84, and the switches A and B are reset so that the detector 100 receives the laser energy from laser B but not the laser energy from laser A in step 86. The method in step 88 measures the loss between laser B and the junction.

The optical switching assembly of the present invention enables fiber optic devices to be fully tested in a production environment without repeated disconnections and reconnections of the device under test. By using junctions connecting an optical fiber from one switch and an optical fiber from another switch to an optical fiber lead connected to the device under test, the optical switching assembly enables different optical paths to be selectively switched to fully test the device under test. Moreover, additional calibration devices, for example reference reflectors or loopback fibers acting as "short circuits," enable the optical switching assembly and/or the laser to be quickly self-tested to identify variations in the optical performance thereof. Hence, the testing equipment including the laser, the detector, and the optical switching assembly can easily perform a self-test at regular intervals by selectively establishing optical paths to the junctions reserved for calibration and performance testing.

The switchbox assembly of the present invention is particularly useful in production environments, where a plurality of devices 10 may be successively connected to the optical switching assembly 30 for testing. Hence, one device may be connected to the switching assembly while another is being tested. Production efficiency is also improved since a fiber optic coupler can be fully tested in a matter of seconds, as opposed to the relatively long time needed to splice, disconnect, and resplice fiber optic devices according to conventional manual procedures.

It will also be appreciated that more advanced switching arrangements may be implemented by cascading two or more switching assemblies 30.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

I claim:

1. A method for testing a fiber optic device, comprising:

connecting at least first and second ends of the fiber optic device to respective first and second junctions of an optical switching assembly, the optical switching assembly comprising a first optical switch and a second optical switch, each of the junctions having first and second optical fibers connecting the corresponding junction to the first and second optical switches, respectively;

setting the first optical switch to route light received from a first light source to the first junction;

setting the second optical switch to route light received from the second junction to a detector; and determining a first characteristic of the fiber optic device based on the light from the first light source transmitted through the first junction and the light received from the second junction.

2. The method of claim 1, wherein said first characteristic determining step comprises:

measuring an output power of the first light source;

measuring a detected power of the light routed to the detector; and calculating said first characteristic based on the output power, the detected power, and a power loss by the optical switching assembly between the first light source and the detector.

3. The method of claim 2, further comprising:

prior to connecting the fiber optic device to the optical switching assembly, determining the power loss by the optical switching assembly, comprising:

(1) connecting the detector to the first junction; and (2) measuring the light routed by the first optical switch to the first junction to determine a first loss by the first optical switch between the first light source and the first junction.

4. The method of claim 3, wherein the power loss determining step further comprises:

(3) connecting a second light source to the second optical switch and setting the second optical switch to route light from the second light source to the first junction;

(4) resetting the first optical switch to route said light from the first light source away from the first junction; and (5) measuring the light routed by the second optical switch to the first junction to determine a second loss by the second optical switch between the second light source and the first junction, the power loss by the optical switching assembly based on the first and second losses.

5. The method of claim 1, further comprising:

prior to connecting the fiber optic device to the optical switching assembly, determining the power loss by the optical switching assembly, comprising:

connecting the first and second junctions together by an optical fiber;, and measuring the light routed by the first and second optical switches via the connected first and second junctions.

6. The method of claim 1, further comprising:

after the first characteristic determining step:

(1) setting the first optical switch to route light received from the first light source to the second junction;

(2) setting the second optical switch to route light received by the first junction from the fiber optic device to the detector; and determining a second characteristic of the fiber optic device based on the light from the first light source transmitted through the second junction to the fiber optic device and the light received from the fiber optic device via the first junction.

7. The method of claim 1, further comprising connecting a second fiber optic device to at least third and fourth junctions, and testing the second device while the first device is connected.

8. The method of claim 1, further comprising calibrating the optical switching assembly.

9. The method of claim 8, wherein the calibrating step comprises:

connecting the first and second ends of an optical fiber to respective third and fourth junctions of the optical switching assembly;

setting the first optical switch to route light received from the first light source to the third junction;

setting the second optical switch to route light received from the fourth junction to the detector; and measuring the light supplied by the second optical switch to the detector, the detected light indicating a loss within the optical switching assembly relative to the input power of the first light source.

10. The method of claim 8, wherein the calibrating step comprises:

connecting a second detector to a third junction;

setting the first optical switch to route light received from the first light source to the third junction; and measuring the light supplied by the third junction to the detector, the measured light indicating the loss by the first optical switch and the third junction relative to the output power of the first light source.

* * * * *